United States Patent Office 3,417,826
Patented Dec. 24, 1968

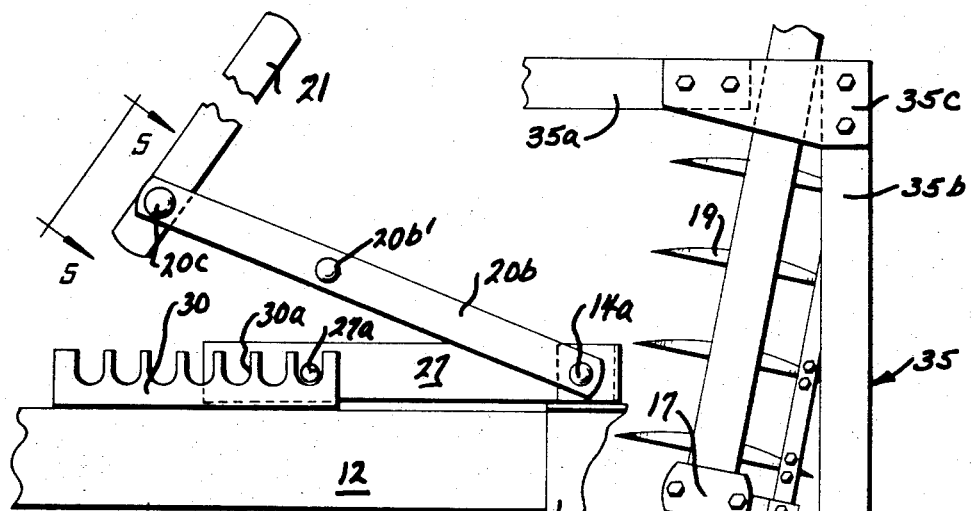

3,417,826
ADJUSTING AND LOCKING STRUCTURE
Oscar D. Jackson, Vanderburgh County, Ind., assignor to Burch Plow Works Inc., Evansville, Ind., a corporation of Indiana
Filed June 6, 1966, Ser. No. 555,550
4 Claims. (Cl. 172—591)

ABSTRACT OF THE DISCLOSURE

An adjusting and locking structure having particular adaptability for use on disc harrows characterized by an articulated pivotal handle assembly which selectively engages notches in a rack disposed on a portion of the framework of the disc harrow, where gangs of discs are disposed on opposite sides of such portion of the framework, connecting to a member which is slidable along such portion of the framework and to which the handle assembly is pivotally secured.

---

The present invention relates to an adjusting and locking structure having particular adaptability for use on a disc harrow or like agricultural equipment.

As is known, in harrowing a field, it is desirable to change the angle of the gangs of discs on the harrow with respect to the path of movement. Heretofore, such a procedure has been rather cumbersome and, as well, time consuming, considering the weight of the gangs of discs and the fact that positive positioning had to be achieved. In this latter connection, the locking of the gangs of discs in the desired angular position was oftentimes on a "cut and try" basis.

By virtue of the instant invention, the applicant herein has provided a new and novel adjusting and locking structure for disc harrows, and for other equipment usages as well. Broadly, the invention comprises an articulated pivotal handle assembly which selectively engages notches in a rack disposed on the center frame tube of the disc harrow. Gangs of discs are disposed on opposite sides of such center frame tube, connecting to a member which is slidable along the center frame tube and to which the handle assembly is pivotally secured. Through a basic leverage principle, the aforesaid handle assembly is readily positioned in the desired notch in the rack, and, hence, the slidable member and the connecting gangs of discs are moved, affording a variety of angular increments between the respective gangs of racks and the center frame tube.

Additionally, a locking relationship is provided for retaining the handle assembly in the desired notch in the rack, and in a positive manner without danger of release during use. The instant invention is highly effective in end results, representing ease to the user coupled with simplicity of action. The applicant's adjusting and locking structure is readily manufactured, requiring normal manufacturing tolerances, and is easily installed at the desired position on the harrow equipment. Obviously, other applications for the applicant's invention are attainable, wherever it is desired to move arms with respect to a central spine, and to lock such arms at any desired angular deviation with respect to such central spine.

Accordingly, the principal object of the present invention is to provide a new and novel adjusting and locking structure.

Another object of the present invention is to provide a new and novel adjusting and locking structure having particular adapatability to disc harrows or like agricultural equipment.

A further and more general object of the present invention is to provide a new and novel adjusting and locking mechanism for a disc harrow which is effectively mounted for use, which is readily and simply used, which is positive in action, which permits locking without danger of release, whch is readily manufactured, and which lends itself to ease and economy to the user thereof.

Other objects and a better understanding of the present invention will become more apparent from the following description, taken in conjunction with the accompanying drawing, wherein:

FIG. 1 is a plan view, partly fragmentary, showing the instant invention used in combination with the back or rear gangs on a conventional disc harrow;

FIG. 2 is a plan view of the applicant's new and novel adjusting and locking structure, similar to that of FIG. 1, but enlarged;

FIG. 3 is a view in vertical section, taken at line 3—3 of FIG. 2 and looking in the direction of the arrows, showing further details of the invention at hand;

FIG. 4 is a view in side elevation of the applicant's structure, where the handle assembly thereof is shown in a position approaching the rack to effect the desired adjusting action; and FIG. 5 is a view in elevation, taken at line 5—5 of FIG. 4 and looking in the direction of the arrows, showing still further details of the instant invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the applicant's new and novel adjusting and locking structure 10 is shown disposed on the center frame tube 12 of a conventional disc harrow. More specifically, the instant invention comprises two basic parts, i.e., a handle assembly 20 and a rack 30, the latter being secured, as by welding, to the aforesaid center frame tube 12. As should be evident, the rack 30 includes a series of notched or cut-out portions 30a along the upper free edge thereof.

A member 14 is slidably disposed about the center frame tube 12, receiving, on its top surface, the handle assembly 20 at pivot 14a. Support arms 16, carrying the mounting arrangements 17 which position the shafts (not shown) for the gang of discs 19 on either side of the center frame tube 12, are pivotally mounted to the slidable member 14 for lateral movement at 14b. In that the mounting of the gangs of discs is conventional, no further description thereof is deemed necessary.

In any event, the disc harrow described herein has conventional supporting framework 35, in that both front and rear gangs of discs are employed, such framework 35 being mounted on tires (not shown) and pulled through the field by a conventional tractor (also not shown). In regard to support arms 16, the free end of each extends through openings defined in the framework 35, in sliding relationship. More particularly, members 35a and 35b defining the framework 35 may be secured together by webs 35c, forming openings through which the free end of each support arm 16 is slidably received. As should be evident from the following description, such a mounting of the support arms 16 assists the desired angular deviation selection for the disc harrow during use.

Considering now the handle assembly 20, two generally parallel arms 20a and 20b are, as stated, pivotally mounted to the slidable member 14 at 14a. The free ends of arms 20a and 20b have a pin 20c extending thereacross to define a pivot axis. A control handle 21 is pivotally mounted at such pin 20c and includes a relatively short member 22 pivotal about pin 20c and interconnected with the control handle 21 by a fixed engaging pin 24, the latter adapted to be selectively received in the notches 30a in the rack 30.

A generally elongated locking member 27 is welded, or otherwise fixedly secured, to the slidable member 14, extending in the direction of the rack 30, and through one portion of which the pivot axis 14a also extends. Arms 20a and 20b have openings 20a' and 20b', respectively, in aligned relationship, while the locking member 27 has an opening 27a also in alignment with such openings 20a' and 20b' at a locked position. In order to achieve a locked relationship, a removable pin 29 is disposed through openings 20a', 20b' and 27a, to be discussed more fully herebelow.

In use, the fixed engaging pin 24 on the control handle 21 is caused to be placed in any notch 30a in the rack 30, effecting forward or rearward movement of the slidable member 14 along the central frame tube 12 of the disc harrow. As the slidable member 14 moves forwardly or rearwardly, the support arms 16 pivot at axes 14b, each sliding within the aforedescribed openings in the framework 35.

When the desired angular deviation is achieved, the control handle 21 is moved rearwardly to an aligned relationship with the other members forming the handle assembly 20. The pin 29 is then disposed through the openings 20a', 20b' and 27a, a fastening pin 29a being employed therewith to effect a positive assembled relationship. As should be apparent, through a lever-type relationship, which provides the necessary force, angular adjustment can be very conveniently accomplished. It might be noted that the same type of adjusting and locking structure is made part of the front gangs of discs on the harrow.

From the preceding, it should be apparent that the applicant herein has provided a new and novel adjusting and locking structure having particular adaptability to disc harrows. The invention is representative of convenience and effectiveness in use and, at the same time, provides positive locking. Depending upon the size of ratchet, a variety of angular changes with respect to the central frame tube can be accomplished with a minimum of effort, all, as stated, based on leverage providing the necessary force.

The adjusting and locking structure described hereabove is, of course, susceptible to various changes within the spirit of the invention. For example, proportioning may be varied, and other comparable locking arrangements employed. Thus, the above description should be considered illustrative and not as limiting the scope of the following claims.

I claim:

1. An adjusting and locking structure comprising a rack secured to a fixed base, a member slidable along said base having a handle assembly secured thereto, said handle assembly having a first portion pivotally mounted to said slidable member and a second portion pivotal on said first portion proximate the free end thereof, said second portion of said handle assembly having an engaging pin selectively cooperable with said rack, gangs of discs having inner ends pivotally secured to said slidable member, and means on said fixed base for slidably mounting the outer ends of said gangs of discs.

2. The adjusting and locking structure of claim 1 where a fixed member is mounted on said slidable member, and where means are provided for selectively locking together said fixed member and a portion of said handle assembly.

3. The adjusting and locking structure of claim 2 where a pin is removably received in openings disposed in said fixed member and said portion of said handle assembly.

4. An adjusting and locking structure comprising a rack secured to a framework, a member slidable along a portion of said framework having a handle assembly secured thereto, said handle assembly having a first portion pivotally mounted to said slidable member and a second portion pivotal on said first portion proximate the free end thereof, said second portion of said handle assembly having an engaging pin selectively cooperable with said rack, said framework having an opening defined in another portion thereof, and a disc-carrying support arm extending from said slidable member and slidably received in said opening, said support arm being pivotally mounted to said slidable member.

References Cited

UNITED STATES PATENTS

| | | | |
|---|---|---|---|
| 370,447 | 9/1887 | Brown | 81—357 |
| 1,181,466 | 5/1916 | Long | 81—357 |
| 3,193,023 | 7/1965 | Adee | 172—581 |

ABRAHAM G. STONE, *Primary Examiner.*

S. C. PELLEGRINO, *Assistant Examiner.*